US006829373B2

(12) United States Patent
Piccinelli et al.

(10) Patent No.: US 6,829,373 B2
(45) Date of Patent: Dec. 7, 2004

(54) AUTOMATIC SETTING OF OPTIMAL SEARCH WINDOW DIMENSIONS FOR MOTION ESTIMATION

(75) Inventors: Emiliano Piccinelli, Monza (IT); Fabrizio Rovati, Cinisello Balsamo (IT); Danilo Pau, Sesto San Giovanni (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 603 days.

(21) Appl. No.: 09/811,351

(22) Filed: Mar. 16, 2001

(65) Prior Publication Data

US 2003/0190059 A1 Oct. 9, 2003

(30) Foreign Application Priority Data

Mar. 17, 2000 (EP) .............................. 00830200

(51) Int. Cl.[7] ................................. G06K 9/00
(52) U.S. Cl. ..................... 382/107; 382/236; 348/699; 375/240.01
(58) Field of Search .................. 382/107, 106, 382/166, 232, 234, 235, 236, 244, 245, 246, 247, 248, 250, 251, 252, 253; 348/699, 700; 375/240.01, 240.13, 240.09, 240.16, 240.24, 242

(56) References Cited

U.S. PATENT DOCUMENTS

| | | | | | |
|---|---|---|---|---|---|
| 5,812,199 | A | * | 9/1998 | Lu et al. | 375/240.16 |
| 6,014,181 | A | * | 1/2000 | Sun | 348/699 |
| 6,084,912 | A | * | 7/2000 | Reitmeier et al. | 375/240.11 |
| 6,289,049 | B1 | * | 9/2001 | Kim et al. | 375/240.16 |
| 6,307,970 | B1 | * | 10/2001 | Schuyler et al. | 382/236 |
| 6,414,992 | B1 | * | 7/2002 | Sriram et al. | 375/240.13 |
| 6,421,384 | B1 | * | 7/2002 | Chung et al. | 375/240.09 |
| 6,480,543 | B1 | * | 11/2002 | Pau et al. | 375/240.16 |

* cited by examiner

Primary Examiner—Bhavesh M. Mehta
Assistant Examiner—Seyed Azarian
(74) Attorney, Agent, or Firm—Lisa K. Jorgenson; Allen, Dyer, Doppelt, Milbrath & Gilchrist, P.A.

(57) ABSTRACT

A method of estimating the motion field of a digital picture sequence includes subdividing a current picture to examine in an integer number of macroblocks, for each macroblock of the current picture determining a search window centered on a macroblock of a preceding picture placed in the same position of the considered macroblock of the current picture, carrying out a motion estimation between the considered macroblock of the current picture and the macroblock most similar to it included in the window. At least a dimension of the search window is established as a function of the corresponding dimension of the search window used for the preceding picture, the estimated motion field of the preceding picture and certain threshold values.

15 Claims, 5 Drawing Sheets

AUTOMATIC SETTING OF OPTIMAL SEARCH WINDOW DIMENSIONS FOR MOTION ESTIMATION

FILED OF THE INVENTION

The present invention relates to methods of encoding video sequences and in particular to a method of optimally setting the dimensions of the search window for a most efficient coding.

BACKGROUND OF THE INVENTION

The invention is useful in digital video coders where it is necessary to evaluate the activity of a block of information in the frequency domain.

Because of the particular importance of the of the widely applied MPEG standard in treating digitized video sequences, to illustrate a practical implementation of the method of the invention, a description of the method implemented within an MPEG2 coding will be presented. Obviously, the method of the invention remains perfectly valid and advantageously applicable even in decoders based on different standards (other than the MPEG), as they are defined from time to time.

Description of the MPEG2 Video Coding

The MPEG (Moving Pictures Experts Group) standard defines a set of algorithms dedicated to the compression of sequences of digitized pictures. These techniques are based on the reduction of the temporal, spatial and statistical redundance of the information constituting the sequence.

Reduction of spatial and statistical redundance is achieved by compressing independently the single images, by means of discrete cosine transform (DCT), quantization and variable length Huffman coding.

The reduction of temporal redundance is obtained using the correlation that exist between successive pictures of a sequence. Approximately, it may be said that each image can be expressed, locally, as a translation of a previous and/or subsequent image of the sequence. To this end, the MPEG standard uses three kinds of pictures, indicated with I (Intra Coded Frame), P (Predicted Frame) and B (Bidirectionally Predicted Frame). The I pictures are coded in a fully independent mode; the P pictures are coded in respect to a preceding I or P picture in the sequence; the B pictures are coded in respect to two pictures, of I or P kind: the preceding one and the following one in the video sequence.

A typical sequence of pictures can be the following one: I B B P B B P B B I B . . . This is the order in which they will be viewed, but given that any P is coded in respect to the previous I or P, and any B in respect to the preceding and following I or P, it is necessary that the decoder receive the P pictures before the B pictures, and the I pictures before the P pictures. Therefore the order of transmission of the pictures will be I P B B P B B I B B . . .

Pictures are elaborated by the coder sequentially, in the indicated order, and subsequently sent to a decoder which decodes and reorders them, allowing their subsequent displaying. To codify a B picture it is necessary for the coder to keep in a dedicated memory buffer, called "frame memory", the I and P pictures, coded and thereafter decoded, to which a current B picture refers, thus requiring an appropriate memory capacity.

One of the most important functions in coding is motion estimation. Motion estimation is based on the following consideration: a set of pixels of a picture frame called current pixel set may be placed in a position of the subsequent and/or precedent picture obtained by rigid translation of the corresponding one to the current pixel set. Of course, these transpositions of objects may expose parts that were not visible before as well as changes of their shape (e.g. during a zooming, rotations and the like).

The family of algorithms suitable to identify and associate these portions of pictures is generally referred to as of "motion estimation". Such association of pixels is instrumental to calculate the relative coordinates between the current portion and the portion identified as the best predictor, and to calculate the portion of picture difference, so removing redundant temporal information, thus making more effective the subsequent processes of DCT compression, quantization and entropic coding.

Such a method finds a typical example in the MPEG-2 standard. A typical block diagram of a video MPEG-2 coder is depicted in FIG. 1. Such a system includes the following functional blocks:

1) Chroma Filter Block from 4:2:2 to 4:2:0

In this block there is a low pass finite time response filter operating on the chrominance component, which allows the substitution of any pixel with the weighed sum of neighboring pixels placed on the same column and multiplied by appropriate coefficients. This allows a subsequent subsampling by two, thus obtaining a halved vertical definition of the chrominance.

2) Frame Ordinator

This blocks includes one or several frame memories outputting the frames in the coding order required by the MPEG standard. For example, if the input sequence is I B B P B B P etc., the output order will be I P B B P B B . . . .

I (Intra coded picture) is a frame or a half-frame containing temporal redundance;

P (Predicted-picture) is a frame or a half-frame whose temporal redundance in respect to the preceding I or P (previously co/decoded) has been removed;

B (Bidirectionally predicted-picture) is a frame or a half-frame whose temporal redundance with respect to the preceding I and subsequent P (or preceding P and subsequent P, or preceding P and subsequent I) has been removed (in both cases the I and P pictures must be considered as already co/decoded).

Each frame buffer in the format 4:2:0 occupies the following memory amount:

Standard PAL

720×576×8 for the luminance ($Y$)=3,317,760 bits

360×288×8 for the chrominance ($U$)=829,440 bits

360×288×8 for the chrominance ($V$)=829,440 bits total $Y+U+V$=4,976,640 bits

Standard NTSC

720×480×8 for the luminance ($Y$)=2,764,800 bits

360×240×8 for the chrominance ($U$)=691,200 bits

360×240×8 for the chrominance ($V$)=691,200 bits total $Y+U+V$=4,147,200 bits

3) Estimator

This block is able to remove the temporal redundance from the P and B pictures.

4) DCT

This is the block that implements the discrete cosine transform according to the MPEG-2 standard. The I picture and the error pictures P and B are divided in blocks of 8*8 pixels Y, U, V, on which the DCT transform is performed.

5) Quantizer Q

An 8*8 block resulting from the DCT transform is then divided by a so-called quantizing matrix (in particular to divide the cosine transformed matrix of the macroblock by the matrix mQuant*Quantizer_Matrix where Quantizer_Matrix is a priori established and can vary from picture to picture) to reduce more or less drastically the bit number magnitude of the DCT coefficients. In such case, the information associated to the highest frequencies, less visible to human sight, tends to be removed. The result is reordered and sent to the subsequent block.

6) Variable Length Coding (VLC)

The codification words output from the quantizer tend to contain null coefficients in a more or less large number, followed by nonnull values. The null values preceding the first nonnull value are counted and the count figure constitutes the first portion of a codification word, the second portion of which represents the nonnull coefficient.

These pairs tend to assume values more probable than others. The most probable ones are coded with relatively short words (composed of 2, 3 or 4 bits) while the least probable are coded with longer words. Statistically, the number of output bits is less than when such a criterion is not implemented.

7) Multiplexer and Buffer

Data generated by the variable length coder for each macroblock, the motion vectors, the kind of macroblock I/P/B, the mQuant values, the quantizing matrices of each picture and other syntactic elements are assembled for constructing the serial bitstream whose final syntax is fully defined by the MPEG-2 video section standard. The resulting bitstream is stored in a memory buffer, the limit size of which is defined by the MPEG-2 standard requisite that the buffer cannot be overflown, otherwise a loss of information useful in decoding would occur. The quantizer block Q attends to the respect of such a limit, by making more or less drastic the division of the DCT 8*8 blocks depending on how far the system is from the filling or depletion limit of such a memory buffer and on the energy of the luminance component of the 16*16 source macroblock taken upstream of the motion estimation, of the prediction error generation and DCT transform processes.

8) Inverse Variable Length Coding (I-VLC)

The variable length coding functions specified above are executed in the inverse order.

9) Inverse Quantization (IQ)

The words output by the I-VLC block are reordered in the 8*8 block structure, which is multiplied by the same quantizing matrix used for its previous quantization.

10) Inverse DCT (I-DCT)

The DCT transform function is inverted and applied to the 8*8 block output by the inverse quantization process. This permits a pass from the domain of spatial frequencies to the pixel domain.

11) Motion Compensation and Storage

At the output of the I-DCT, either of the following may be present:

a decoded I picture (or half-picture) which must be stored in a respective frame memory for removing subsequently the temporal redundancy in respect thereto from successive P and B pictures; or a decoded prediction error picture (or half-picture) P or B which must be summed to the information previously removed during the motion estimation phase. In case of a P picture, such a resulting sum, stored in dedicated frame memory is used during the motion estimation process for the successive P pictures and B pictures.

These frame memories are distinct from the memories used for re-arranging the blocks.

12) Display Unit from 4:2:0 to 4:2:2

This unit converts the pictures from the format 4:2:0 to the format 4:2:2 and generates the interlaced format for the subsequent displaying. The chrominance components eliminated via the functional block 1, are restored by interpolation of the neighboring pixels. The interpolation includes a weighed sum of the neighboring pixels for appropriate coefficients and in limiting between 0 and 255 the value so obtained.

Let us consider a picture frame formed by a pair of half-frames. Each half-frame is formed by luminance and chrominance components. Let us suppose, for example, to apply the algorithm for measuring the macroblock activity only on the most energetic component, that is the richest of information, such as the luminance component.

Let this component be represented in form of a matrix of N rows and M columns. Let us divide each frame in portions called macroblocks, each of R rows and S columns. The results of the divisions N/R and M/S must be two integers, not necessarily equals to each other.

The MPEG2 establishes the dimension R=16 and S=16 which are considered as a good example for illustrating the method of the present invention.

Let $MBq(i,j)$ be a macroblock belonging to the current frame and subjected to MPEG2 coding (motion estimation, prediction error calculation, DCT transform, quantization etc.) and whose first pixel, at the top left side, is in the cross-position between the i-th row and j-th column. The pair (i,j) is characterized in that i and j are integer multiples of R and S, respectively.

The location of such a macroblock on the picture and the dashed horizontal arrows indicating the scanning order used to locate macroblocks, are depicted in FIG. 5.

Let $MBe(i,j)$ be the prediction error macroblock calculated as the difference between corresponding pixels of two macroblocks: the first being the $MBq(i,j)$ macroblock belonging to the current frame and the second being a macroblock $MBp(k,h)$ that resulted to be the best predictor of MBq at the end of the process of motion estimation and belonging to a precedent and/or to a following frame or being an average of both. In particular, if the current picture is of I kind then $MBe(i,j)=MBq(i,j)$, while if the picture is of P or B kind then $MBq(i,j)=MBq(i,j)-MBp(k,h)$.

As described in prior European Patent Applications EP-A-0917363 and EP-A-0944245, the motion estimation algorithm may include two steps: a first step, called "Coarse search" and a second step called "Fine search". The scheme of FIG. 2 is valid in case two pictures (Bidirectional Predictive) are present between two successive reference (I) pictures.

The first step of motion estimation is carried out directly on the original pictures, in their sequential order of sequence acquisition, generating a succession of motion fields ("motion vector fields") that will be used and refined during the second step of "Fine search", by referring to previously encoded-decoded reference pictures (of I or P kind) according to the encoding order that is necessarily different from the order of the pictures.

Unlike a common full-search motion estimation approach, in which all macroblocks contained in a certain area, called "search window", of the picture are tested, in the approach described in the two above identified prior patent applications there is not the algorithmic need of establishing a priori the dimensions of such areas. Nevertheless, to make easier a correct alignment of vectors resulting from the two estimation steps and not waste bits, it is more convenient to determine in advance search windows that are the smallest possible ones, compatible with the motion content of the sequences to process.

There is also a second reason, due to the standard MPEG2 that makes necessary such search windows as described in paragraphs 6.2.3.1, 6.3.10, 7.6.3.1 and 7.6.3.2 relating to the standard ISO/IEC 13818.2 in the section relating to the "Picture coding extension", in the produced bit-streams it is necessary to insert the so-called "f-code" or codes that the decoder will use to decode the encoded motion vectors. Such codes represents variability fields for the motion vectors (see table 7–8 of the standard), and this implicitly describes the maximum size of the search window applicable to the motion estimation of the encoder. They can be different for each picture, but they must be placed in the output stream before the data relative to the pixels that compose the picture.

It is evident the need for an adaptive and predictive algorithm, that establishes certain not excessively large search windows for each picture, to reduce the disalignment of the motion vectors and to save information bits, but also to avoid that search windows that are too small for the motion content of the sequences interfere negatively with the motion estimation process, impeding its correct detection.

SUMMARY OF THE INVENTION

It is an object of this invention to provide a method of estimating the motion field of a sequence of digital pictures that allows the setting of the optimal dimensions of a search window and the optimal length of the string used to encode motion vectors.

More precisely, an object of the invention is a method of estimating the motion field of a digital picture sequence that comprises subdividing a current picture to examine in an integer number of macroblocks, for each macroblock of the current picture determining a search window centered on a macroblock of a preceding picture placed in the same position of the considered macroblock of the current picture, carrying out a motion estimation between the considered macroblock of the current picture and the macroblock most similar to it included in the window. The method of the invention is characterized in that at least a dimension of the search window is established in function of the corresponding dimension of the search window used for the preceding picture, of the estimated motion field of the preceding picture and of certain arbitrary threshold values.

A preferred way of calculating the considered dimension of the search window established for the current picture includes setting it equal to the corresponding dimension of the search window used for the preceding picture if the maximum motion vector of the preceding picture is comprised between a pair of threshold values upper and lower, or setting it equal to one half of the corresponding search window used for the preceding picture, if the maximum motion vector of the preceding picture is lower than the lower threshold, or setting it equal to the double of the corresponding dimension of the search window used for the preceding picture, if the maximum motion vector of the preceding picture is greater than the upper threshold.

The method of the invention may include a preliminary motion estimation step, carried out in the above described way, followed by a fine estimation step wherein at least a dimension of the search window is established as a function of the corresponding dimension of the search window used for the preceding picture, of motion vectors of the preceding and current pictures, of lengths of bit-strings used to encode the motion vectors, of the kind of the current picture and of a certain arbitrary threshold.

BRIEF DESCRIPTION OF THE DRAWINGS

The different aspects and advantages of the invention will appear more clearly by a detailed description of an embodiment of the invention by referring to the attached drawings wherein.

DETAILED DESCRIPTION OF THE PREFERRED EMBODIMENTS

The present invention allows the setting of the size of a search window for the motion estimation of a macroblock, such to determine a window of minimum size containing the macroblock of a preceding picture most similar, to the current macroblock, thus reducing the time needed for analyzing all the macroblocks of the search window.

The length of the bit-string necessary to encode the motion vectors of a picture is determined by the so-called "f-code" or codes, that are inserted in the bit-stream relative to the picture. In a real-time embodiment of the encoding process, it is not possible to belatedly determine such codes, i.e. after having carried out the motion estimation of a whole picture and having found the maximum motion vector, because the information relating to the f-codes, as above mentioned, must be inserted in the bit-stream at the beginning of data relative to the current picture.

The present invention solves this problem by determining a priori such a bit-length, by examining the pictures that precede the current picture and estimating the magnitude of the maximum motion vector.

By referring to a motion estimator that uses the approach described in the above mentioned prior patent applications, it is possible to use the results provided by the so-called "Coarse search", which does not need any f-code, for the successive "Fine search" step.

Figure 3:
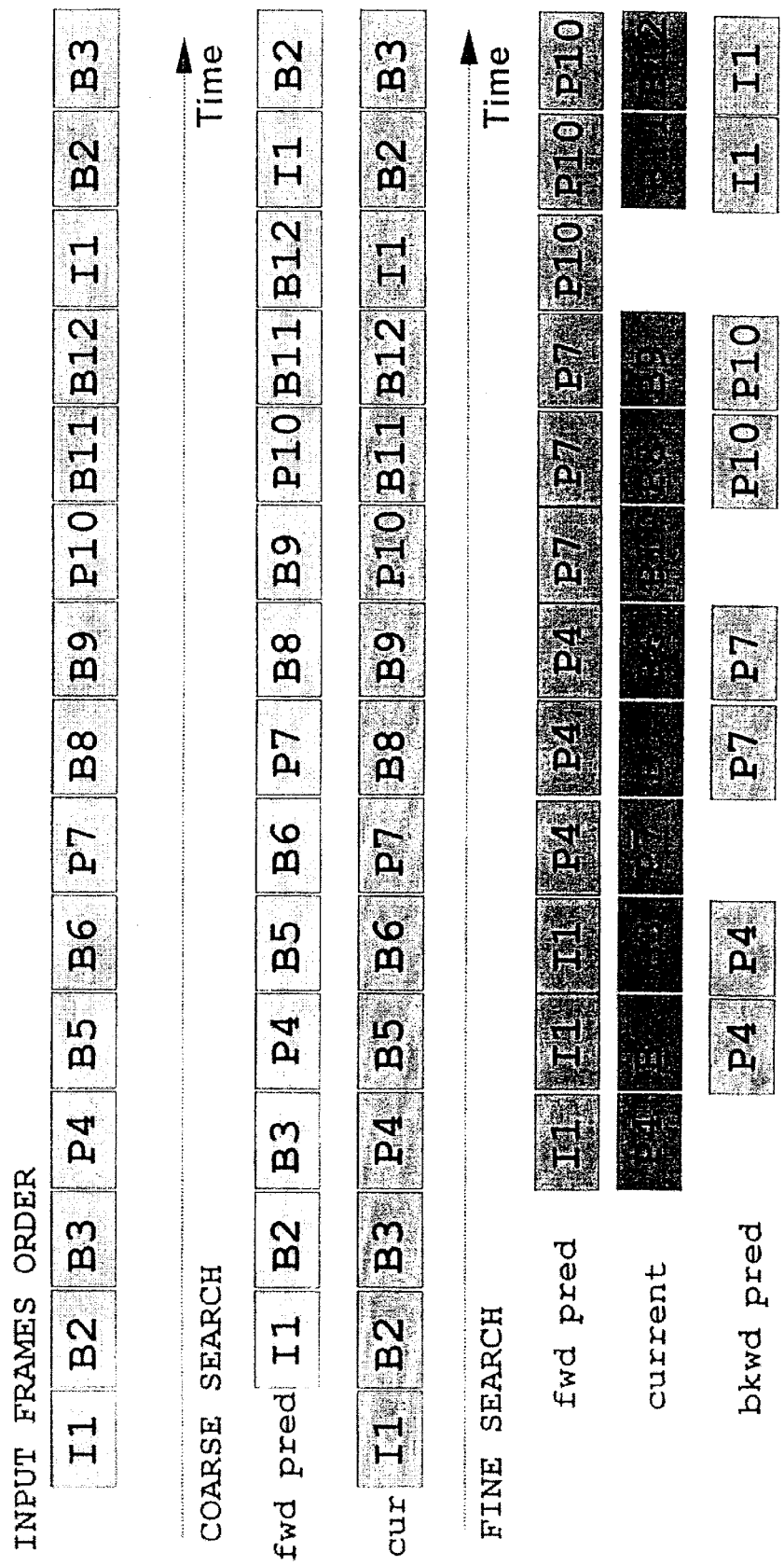
FIG. 3 is a schematic diagram showing the order in which the various pictures are fed to the encoder and processed through "Coarse search" and "Fine search" steps.

Nevertheless, still referring to FIG. 3, and to a real time embodiment, it is not always possible to use the results provided by the "Coarse search" relative to the same picture of which the "f-code" must be calculated. In particular, this is not possible in the case of reference picture of P kind, because the Coarse and Fine estimations are carried out in parallel, with a "delay" of a macroblock.

By observing FIG. 3 from top to bottom, it is possible to see how the two estimations may progress in parallel. For example, in the particular case in which there are two B pictures between two successive reference pictures (I or P pictures), the "Coarse search" of pictures precedes the relative "Fine search" by a time interval of three frame periods while this does not happen with the reference pictures. As a consequence, a different strategy is necessary for the "Coarse search" in respect to the "Fine search" and yet another different strategy within this latter because a picture that will become a new reference picture, instead of a "Bidirectional predictive" picture may be processed.

Coarse Search

In this step, pictures are elaborated sequentially in the order of acquisition. Therefore, the time separation between two successive pictures is equal to a frame period. As described in FIG. 2, the motion field of a certain picture is estimated in respect to the immediately preceding picture in the displaying order.

The initial size of the search window, valid only for the first processed picture, can be arbitrarily chosen (for example equal to the maximum allowed by the MPEG2 standard). From the second picture onwards, the size of the search window is modified by modifying one or both its dimensions. More precisely, value calculated in function of the motion detected in the preceding picture is assigned to each horizontal or vertical position of the search window.

A method of calculating such a dimension includes verifying whether the maximum motion vector of the preceding picture is between an upper bound and a lower bound: if so the considered dimension of the search window of the current picture is made equal to the dimension of the preceding one, otherwise it will be doubled if the maximum motion vector is greater than the upper bound or halved if the maximum motion vector is lower than the lower bound. That upper and lower bounds can be chosen as the product of the dimension of the search window of the preceding picture by an arbitrary coefficient.

Figure 4:
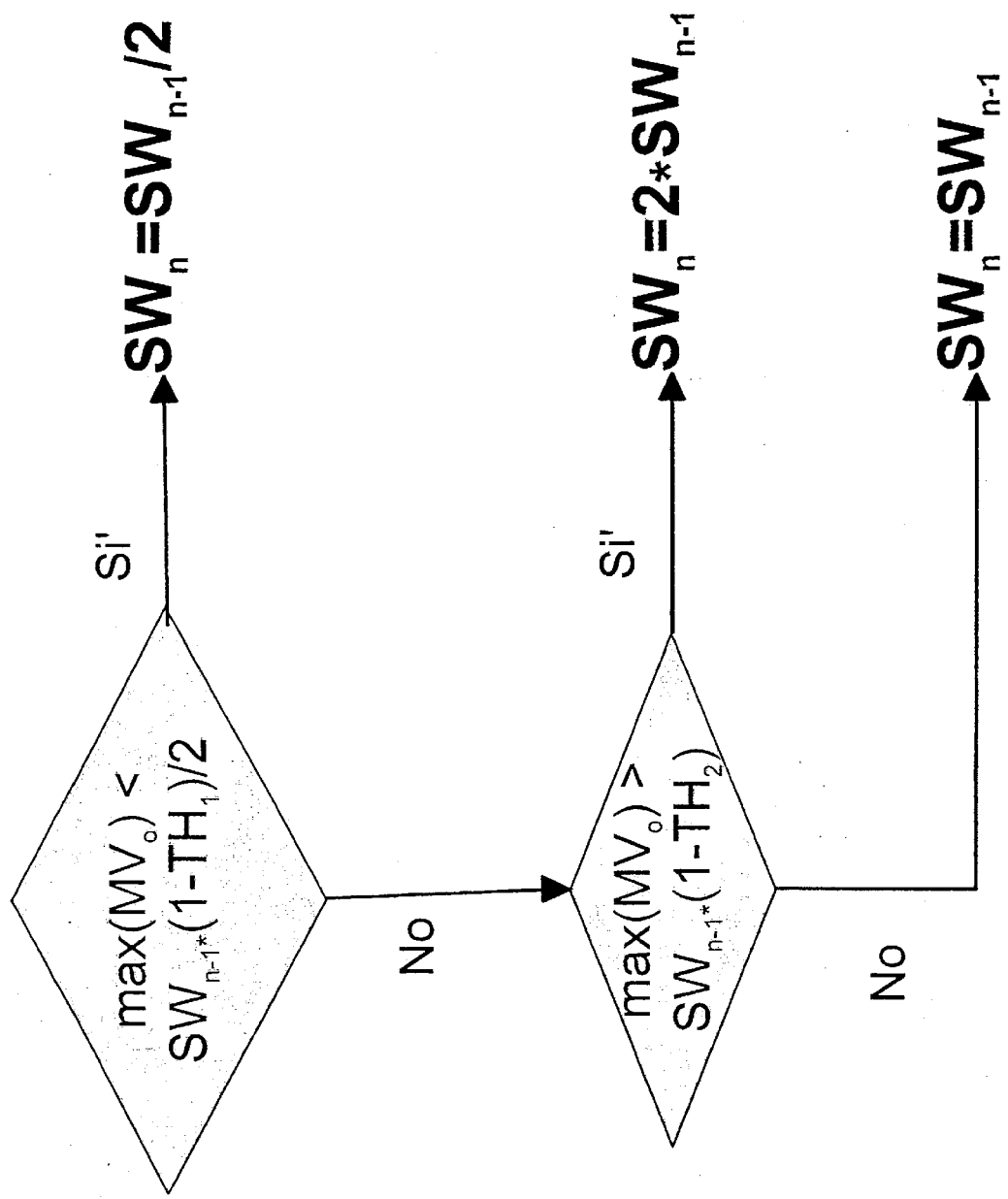
FIG. 4 is a flowchart showing the algorithm for choosing a dimension of the search window for a "Coarse search" in accordance with the present invention.
Figure 5:
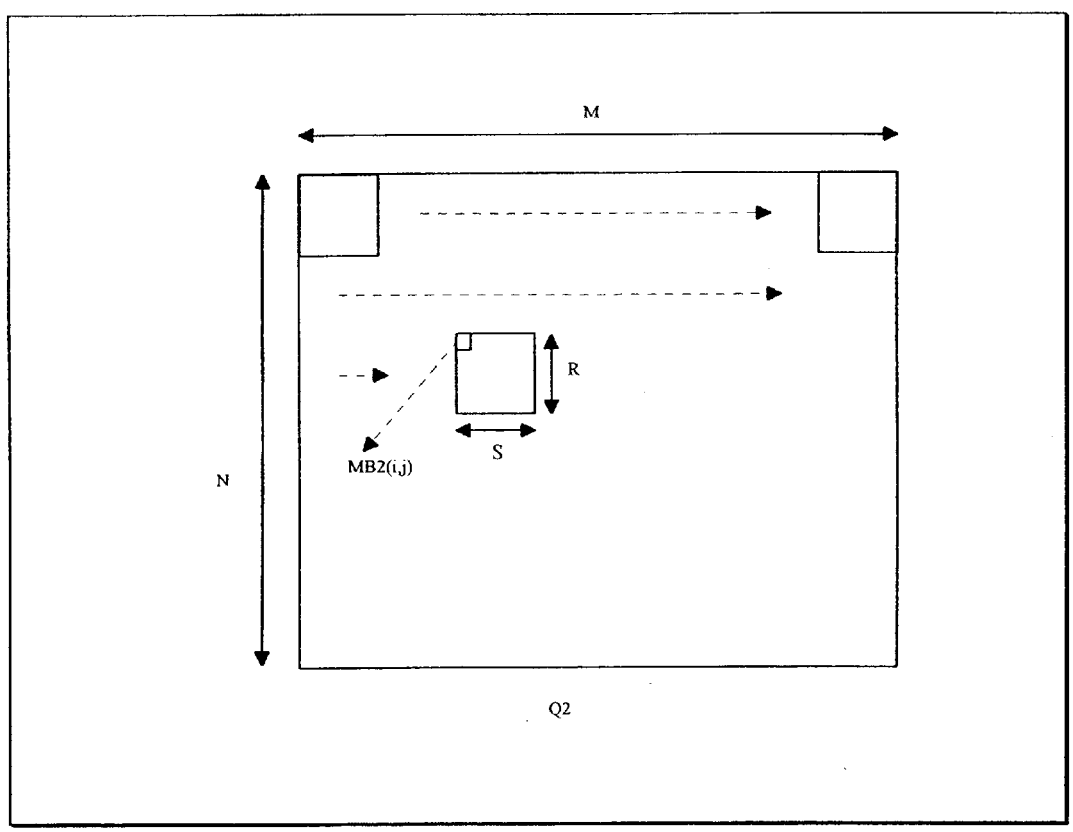
FIG. 5 is a schematic diagram depicting the position of a certain macroblock on the picture and the directions of scan.

A preferred embodiment of the method of the invention is depicted in FIG. 4 wherein:

$SW_{n-1}$ is one of the two dimension (horizontal or vertical) of the old search window and $SW_n$ is one of the two dimensions of the current search window;

$\max(MV_{n-1})$ is the maximum component (horizontal or vertical) of the motion vectors relative to the immediately preceding picture (either according to the displaying order or to the "Coarse Search" processing order); and $TH_1$ and $TH_2$ are two arbitrary thresholds (whose value is comprised between 0 and 1).

Fine Search

Figure 1:
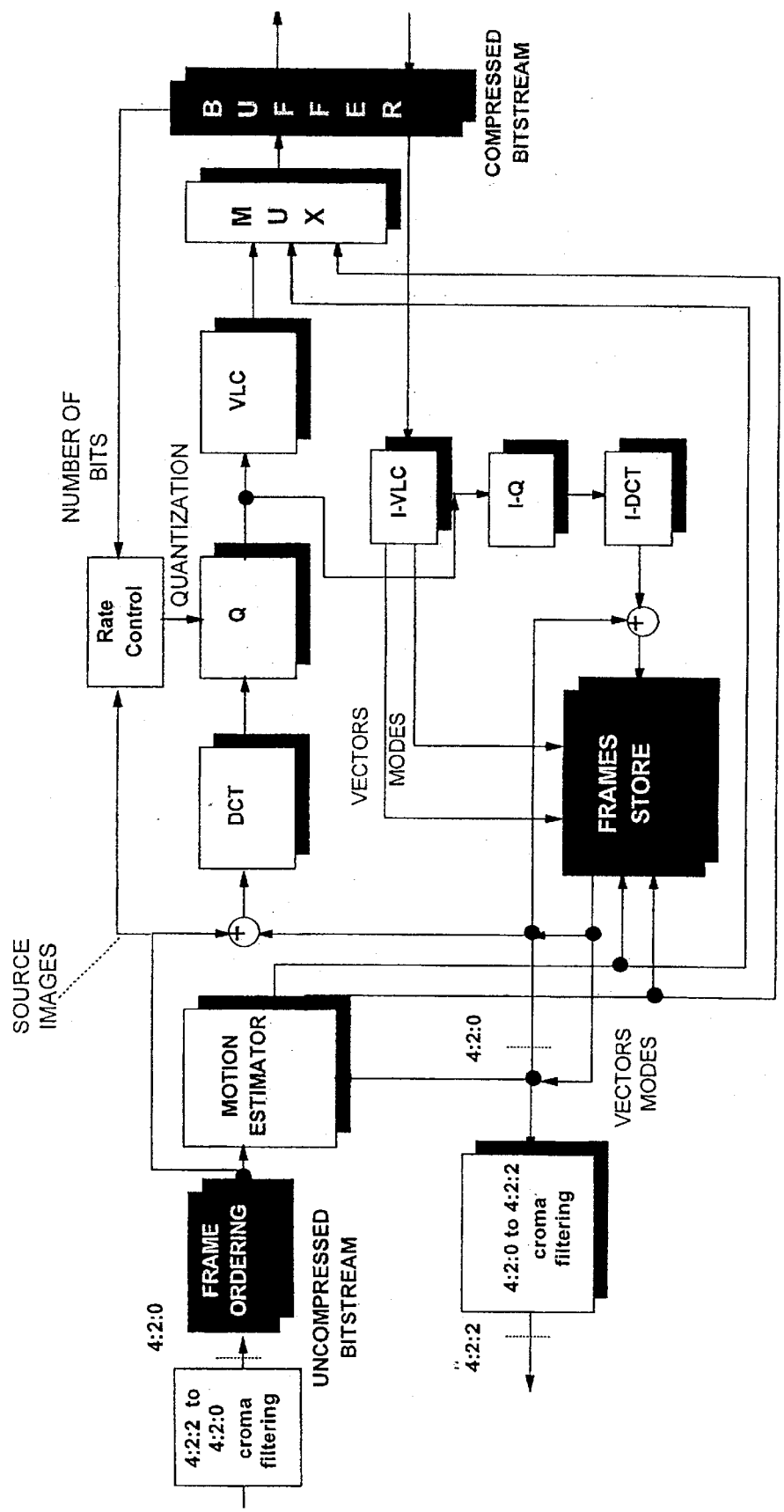
FIG. 1 is a block diagram of a MPGE2 video encoder.
Figure 2:
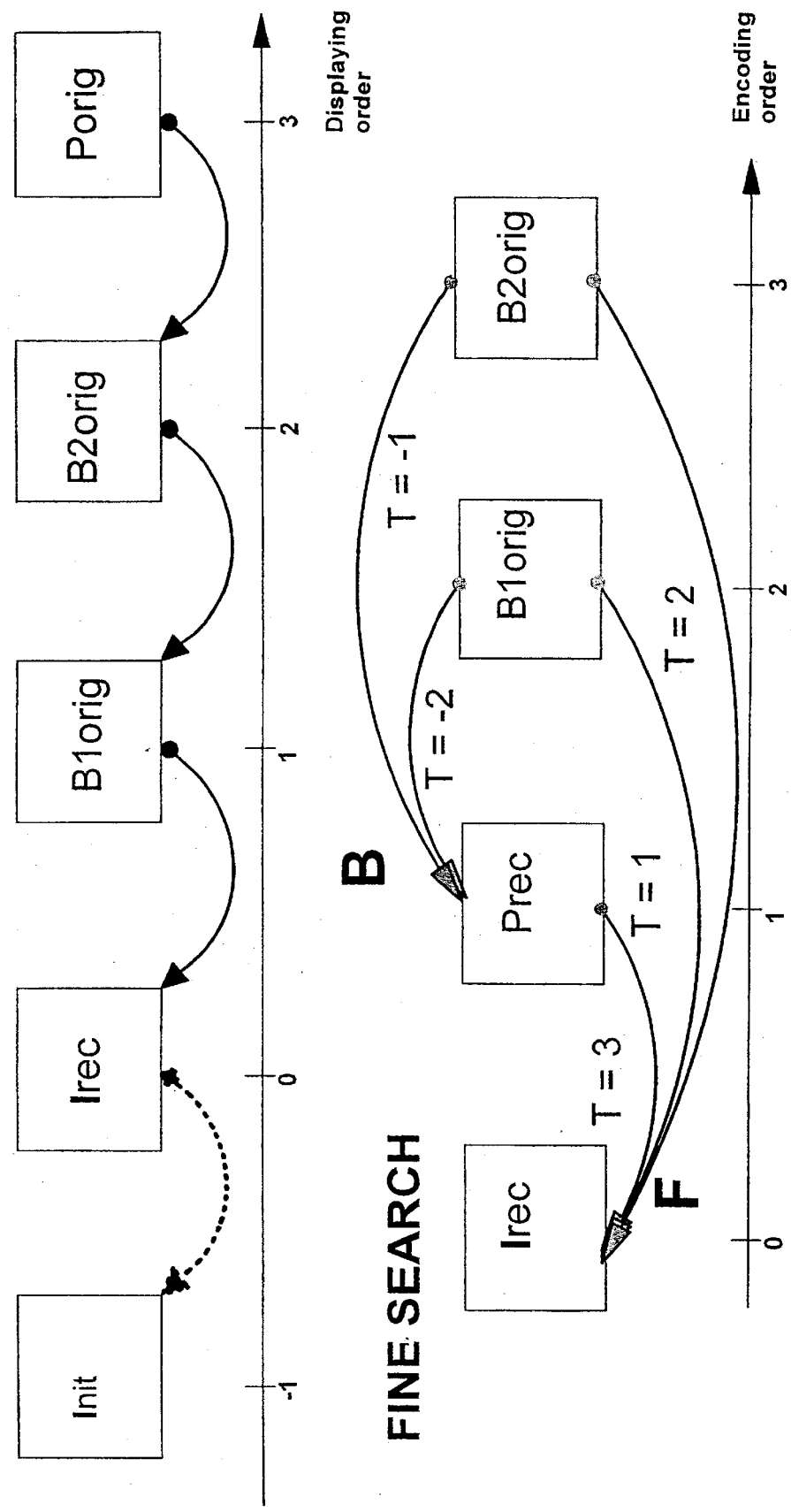
FIG. 2 is a schematic diagram showing the picture used for carrying out the motion estimation for different kinds of pictures.

The "Fine search" is carried out by treating the pictures in the order they are fed. As illustrated in FIG. 2, the motion estimation of a picture can be carried out either in respect to a picture that is going to be displayed after the current one ("Backward prediction") or in respect to an already displayed picture ("Forward prediction"). The two different modes of estimating the motion field, indicated in FIG. 2 with a "B" and a "F" respectively, also imply a different temporal separation "T", expressed in frame periods.

For sake of simplicity, the parameter "T" describing the temporal separation, expressed in frame periods between two successive reference pictures (of I or P kind) is equal to 3. Therefore, there are two B pictures between them, though the method of the invention remains valid for any value of T.

The considered dimension $SW_n$ of the search window for the current picture is calculated as a function of the corresponding dimension relative to the preceding picture, of the maximum motion vector of the preceding or current picture, of the length of the bit-strings used for encoding the motion vectors, of I, P or B kind of the current picture and of a certain arbitrary threshold. A preferred way of carrying out this calculation will be described, by assuming that:

$SW_{n-1}$ is one of the two dimensions (horizontal or vertical) defining the old search window and $SW_n$ is the corresponding one of the two dimensions defining the current search window;

$\max(MV_{n-1})$ is the maximum component of the motion vectors (horizontal or vertical) calculated in the "Coarse" estimation step, related to:

the last picture of "B" kind if the current picture is of "P" kind, multiplied by T, the same picture in the remaining cases, linearly scaled in function of the time separation between the current picture and the relative reference pictures; is the minimum f-code that would allow the encoding of a certain motion vector V, and are the f-codes immediately preceding and following, the new code to insert in the output bit-stream;

$[FC]^{-1}$ is the inverse operation allowing the transition from a determined f-code to the relative maximum motion vector that can be encoded; and $TH_3$ is an arbitrary threshold;

The value of $\max(MV_{n-1})$ is compared with a comparison value $f(TH_3, [FC_{-1}^{max(MV0)}]^{-1}, [FC^{max(MV0)}]^{-1})$ calculated according to a certain function $f(\ )$, to verify whether the dimensions of the preceding search window are sufficiently greater than the maximum motion vector found in the "Coarse" estimation step. If $\max(MV_{n-1})$ exceeds the comparison value $FC_n = FC_{+1}^{max(MV0)}$ otherwise $FC_n = FC^{max(MV0)}$.

In practice, if $\max(MV_{n-1})$ exceeds the comparison value a search window larger than the current one must be chosen, therefore the f-code $FC_{+1}^{max(MV0)}$ successive to the considered one $FC^{max(MV0)}$ is assumed.

According to a preferred embodiment of the invention, the comparison value is chosen in the following manner:

$$f(TH_3, [FC_{-1}^{max(MV_0)}]^{-1}, [FC^{max(MV_0)}]^{-1}) = \frac{TH_3 \cdot [FC_{-1}^{max(MV_0)}]^{-1} + (1 - TH_3) \cdot [FC^{max(MV_0)}]}{2}$$

wherein $TH_3$ is a threshold whose value is comprised between 0 and 1. If $$\max(MV_{n-1}) > \frac{TH_3 \cdot [FC_{-1}^{max(MV_0)}]^{-1} + (1 - TH_3) \cdot [FC^{max(MV_0)}]^{-1}}{2}$$

thus it is set $$FC_n = FC_{+1}^{max(MVo)}$$

otherwise.

$$FC_n = FC^{max(MV0)}$$

Once the f-code has been so determined, the size of the search window for the current picture is set equal to the dimension of the maximum vector that can be encoded by it, i.e. $SW_n = [FC_n]^{-1}$.

That which is claimed is:

1. A method of estimating the motion field of a digital picture sequence comprising:

dividing a current picture into macroblocks;

for each macroblock of said current picture, determining a search window centered on a macroblock of a preceding picture placed in a same position of a considered macroblock of the current picture, at least one dimension of said search window being established as a function of the corresponding dimension of the search window used for said preceding picture, an estimated motion field of said preceding picture and threshold values, and the at least one dimension being equal to the corresponding dimension of the search window used for the preceding picture if a maximum motion vector of the preceding picture is between a pair of upper and lower threshold value, one half of the corresponding dimension of the search window used for the preceding picture, if the maximum motion vector of the preceding picture is less than the lower threshold, twice the corresponding dimension of the search window used for the preceding picture, if the maximum motion vector of the preceding picture is greater than the upper threshold; and carrying out an estimation of the motion field between the considered macroblock of the current picture and a macroblock most similar to it included in the search window.

2. The method according to claim 1 wherein the lower threshold is equal to half a product between the corresponding dimension of th search window used for the preceding picture and a first coefficient between zero and one, and wherein the upper threshold is equal to a product between the corresponding dimension of the search window used for the preceding picture and a second coefficient between zero and one.

3. The method according to claim 1 wherein the estimation of the motion field is carried out by a preliminary motion estimation followed by a fine motion estimation wherein at least one dimension of the search window is established as a function of the corresponding dimension of the search window used for the preceding picture, motion vectors of the preceding and current pictures, lengths of bit-strings used to encode the motion vectors, kind of the current picture and a predetermined threshold.

4. The method according to claim 3 wherein the dimension of said search window established for the current picture is established by:

calculating a product between a maximum motion vector calculated for the preliminary estimation, applied to a last picture of a bidirectionally predicted frame if the current picture is a predicted frame, and to the current picture in the other cases, and a time separation expressed in number of frames between the picture on which the preliminary estimation is applied and a relative reference picture;

calculating a length of a shortest bit-string necessary for encoding a motion vector whose amplitude is equal to the product; and setting the at least one dimension of said search window established for the current picture equal to the minimum amplitude of a search window suitable to detect a maximum motion vector that can be encoded with a it-string of the length or greater, depending on whether the product does not exceed or exceeds a product threshold value, determined as a function of the length and of a non-negative coefficient.

5. The method according to claim 4 wherein the product threshold value is equal to one half of the average weighed with a coefficient of maximum amplitude of a motion vector that can be encoded w th a bit-string of the length, and the maximum amplitude of a motion vector that can be encoded with a bit-string of the length minus one.

6. A method of estimating the motion field of a digital picture sequence comprising:

dividing a current picture of the digital picture sequence into macroblocks;

determining a search window, for each macroblock of said current picture, centered on a macroblock of a preceding picture in a same position of a macroblock of the current picture, a dimension of said search window being established as a function of a corresponding dimension of the search window used for the preceding picture and an estimated motion field of the preceding picture, and, the dimension being equal to the corresponding dimension of the search window used for the preceding picture is a maximum motion vector of the preceding picture is between a pair of upper and lower threshold values, one half of the corresponding dimension of the search window used for the preceding picture, if the maximum motion vector of the preceding picture is less than the lower threshold value, and twice the corresponding dimension of the search window used for the preceding picture, if the maximum motion vector of the preceding picture is greater than the upper threshold value; and estimating the motion field between the macroblock of the current picture and a most-similar-macroblock included in the search window.

7. The method according to claim 6 wherein the lower threshold is equal to half a product between the corresponding dimension of the search window used for the preceding picture and a first coefficient between zero and one, and wherein the upper threshold is equal to a product between the corresponding dimension of the search window used for the preceding picture and a second coefficient between zero and one.

8. The method according to claim 6 wherein estimating the motion field includes a preliminary motion estimation followed by a fine motion estimation wherein at least one dimension of the search window is established as a function of at least the corresponding dimension of the search window used for the preceding picture, motion vectors of the preceding and current pictures, and lengths of bit-strings used to encode the motion vectors.

9. The method according to claim 8 wherein the dimension of said search window established for the current picture is established by:

calculating a product between a maximum motion vector calculated for the preliminary estimation, applied to a last picture of a bidirectionally predicted frame if the current picture is a predicted frame, and to the current picture in the other cases, and a time separation expressed in number of frames between the picture on which the preliminary estimation is applied and a relative reference picture;

calculating a length of a shortest bit-string necessary for encoding a motion vector whose amplitude is equal to the product; and setting the at least one dimension of said search window established for the current picture equal to the minimum amplitude of a search window suitable to detect a maximum motion vector that can be encoded with a it-string of the length or greater, depending on whether the product exceeds a product threshold value, determined as function of the length and of a non-negative coefficient.

10. The method according to claim 9 wherein the product threshold value is equal to one half of the average weighed with a coefficient of a maximum amplitude of a motion vector that can be encoded with a bit-string of the length, and the maximum amplitude of a motion vector that can be encoded with a bit-string of the length minus one.

11. A video coding system comprising:

a frame ordinator for receiving an uncompressed bit-stream and outputting frames in a coding order; and a motion estimator for receiving the frames in the coding order from the frame ordinator, and estimating a motion field of a digital picture sequence by dividing a current picture of the digital picture sequence into macroblocks, determining a search window, for each macroblock of the current picture, centered on a macroblock of preceding picture in a same position of a macroblock of the current picture, a dimension of the search window being established as a function of a corresponding dimension of the search window used for the preceding picture and an estimated motion field of the preceding picture, and estimating the motion field between the macroblock of the current picture and a most-similar-macroblock included in the search window, the dimension of said search window used for the current picture being equal to the corresponding dimension of the search window used for the preceding picture if a maximum motion vector of the preceding picture is between a pair of upper and lower threshold values, one half of the corresponding dimension of the search window used for the preceding picture, if the maximum motion vector of the preceding picture is less than the lower threshold value, and twice the corresponding dimension of the search window used for the receding picture, if the maximum motion vector of the preceding picture is greater than the upper threshold value.

12. The video coding system according to claim 11 wherein the lower threshold is equal to half a product between the corresponding dimension of the search window used for the preceding picture and a first coefficient between zero and one, and wherein the upper threshold is equal to a product between the corresponding dimension of the search window used for the preceding picture and a second coefficient between zero and one.

13. The video coding system according to claim 11 wherein the motion estimator estimates the motion field via a preliminary motion estimation followed by a fine motion estimation wherein at least one dimension of the search window is established as a function of at least the corresponding dimension of the search window used for the preceding picture, motion vectors of the preceding and current pictures, and lengths of bit-strings used to encode the motion vectors.

14. The video coding system according to claim 13 wherein the dimension of the search window established for the current picture is established by:

calculating a product between a maximum motion vector calculated for the preliminary estimation, applied to a last picture of a bidirectionally predicted frame if the current picture is a predicted frame, and to the current picture in the other cases, and a time separation expressed in number of frames between the picture on which the preliminary estimation is applied and a relative reference picture;

calculating a length of a shortest bit-string necessary for encoding a motion vector whose amplitude is equal to the product; and setting the at least one dimension of said search window established for the current picture equal to the minimum amplitude of a search window suitable to detect a maximum motion vector that can be encoded with a bit-string of the length or greater, depending on whether the product exceeds a product threshold value, determined as function of the length and of a non-negative coefficient.

15. The video coding system according to claim 14 wherein the product threshold value is equal to one half of the average weighed with a coefficient of a maximum amplitude of a motion vector that can be encoded with a bit-string of the length, and the maximum amplitude of a motion vector that can be encoded with a bit-string of the length minus one.

* * * * *

UNITED STATES PATENT AND TRADEMARK OFFICE
CERTIFICATE OF CORRECTION

PATENT NO. : 6,829,373 B2
DATED : December 7, 2004
INVENTOR(S) : Emiliano Piccinelli, Fabrizio Rovati and Danilo Pau It is certified that error appears in the above-identified patent and that said Letters Patent is hereby corrected as shown below:

<u>Column 4,</u>
Line 49, delete "MBq(i,j)=MBq(i,j)-MBp(k,h)" insert
-- MBe(i,j)=MBq(i,j)-MBp(k,h) --

<u>Column 9,</u>
Line 28, delete "th search" insert -- the search --
Line 61, delete "it-string" insert -- bit-string --

<u>Column 10,</u>
Line 1, delete "w th" insert -- with --
Line 64, delete "it-string" insert -- bit-string --

Signed and Sealed this

Tenth Day of May, 2005

JON W. DUDAS
*Director of the United States Patent and Trademark Office*